United States Patent [19]
Lee

[11] Patent Number: 5,202,693
[45] Date of Patent: Apr. 13, 1993

[54] GPS SIGNAL PROCESSING WITH 5-LEVEL CARRIER INJECTION DEMODULATION FUNCTION USING DUAL 3-LEVEL SINGLE SIDEBAND MIXERS

[75] Inventor: Wai-Cheung Lee, Marion, Iowa

[73] Assignee: Rockwell International Corporation, Seal Beach, Calif.

[21] Appl. No.: 857,201

[22] Filed: Mar. 25, 1992

[51] Int. Cl.$^5$ .................................................. H04B 7/185
[52] U.S. Cl. ................................................................ 342/357
[58] Field of Search ........................ 342/352, 356, 357

[56] References Cited

U.S. PATENT DOCUMENTS 4,578,678  3/1986  Hurd ...................................... 342/357
4,821,294  4/1989  Thomas, Jr. ........................... 342/352
5,115,454  5/1992  Kucar ....................................... 375/77

Primary Examiner—Theodore M. Blum
Attorney, Agent, or Firm—Gregory G. Williams; M. Lee Murrah; H. Frederick Haman

[57] ABSTRACT

An improved GPS receiver including a 5-level carrier injection function for digitally demodulating down-converted GPS signals, which utilizes dual 3-level single sideband mixers where one of the single sideband mixers is delayed by a predetermined interval, thereby allowing for the combination of the two 3-level single sideband mixers to be combined to provide an overall output signal which is representative of an output of a demodulator using a 5-level carrier injection signal.

5 Claims, 5 Drawing Sheets

GPS SIGNAL PROCESSING WITH 5-LEVEL CARRIER INJECTION DEMODULATION FUNCTION USING DUAL 3-LEVEL SINGLE SIDEBAND MIXERS

THE FEEL OF THE INVENTION

The present invention generally relates to electronic navigation equipment, and more particularly relates to global positioning system (GPS) receivers, and even more particularly relates to an improved GPS receiver with a 5-level carrier injection signal digital demodulator.

BACKGROUND OF THE INVENTION

In the past, GPS receivers have frequently used analog carrier injection demodulation schemes to demodulate the down converted digital GPS signal. The miniature GPS receiver (MGR) described in an article entitled "A Miniature GPS Receiver" by N. B. Hemesath et al in Volume 30, Number 9, Microwave Journal September 1987, starting at page 81, is one of the first GPS receivers that utilizes digital demodulation techniques, it uses a 3-level carrier injection demodulation scheme. A more detailed description of the GPS chip set contained therein was discussed in a paper entitled "DARPA'S Advanced Technology Chip Set" presented by N. B. Hemesath and J. M. H. Bruckner at the ION Satellite Division International Technical Meeting in Colorado Springs, Colo., September 1988; the above referenced article and paper are hereby incorporated herein by these references.

Also in the past, it has been proposed to improve performance of GPS receivers (ie reduce the signal loss) by increasing to a 5 or 7-level carrier injection signal demodulation scheme. However, such schemes with their 5-level or 7-level mixers require much more complicated gate systems and consequently are more expensive and consume more power.

Consequently, there exists a need for improved GPS receivers, which have enhanced performance without excessively complicated gate systems and their associated need for power.

SUMMARY OF THE INVENTION

It is an object of the present invention to enhance performance of GPS receivers.

It is a feature of the present invention to provide the function of a 5-level carrier injection signal into the digital demodulator.

It is an advantage of the present invention to reduce signal loss in a GPS receiver.

It is another object of the present invention to reduce complexity in a 5-level injection signal demodulation system.

It is another feature of the present invention to use dual 3-level injection signals separated by ¼ of a carrier cycle delay instead of a 5-level injection signal.

It is another advantage of the present invention to eliminate the need for a two's compliment adder and reduce the overall number of gates necessary to accomplish the digital demodulation.

The present invention provides a GPS receiver having a demodulator with a 5-level carrier injection signal function, which was designed to satisfy the aforementioned needs, contain the above described features, and produce the previously stated advantages. The invention is a "5-level mixer-less" system in the sense that the digital hardware for directly providing 5 levels of data output from the mixing of a 5-level injection signal with a GPS signal is not utilized. Instead, dual 3-level injection signals separated by a delay of ¼ cycle are utilized.

Accordingly, the present invention comprises a GPS receiver including a digital demodulator having a first 3-level injection signal and a second 3-level injection signal where the second injection signal is delayed by ¼ cycle.

BRIEF DESCRIPTION OF THE DRAWINGS

The invention may be more fully understood by reading the following description of the preferred embodiments of the invention in conjunction with the appended drawings wherein.

DETAILED DESCRIPTION

Figure 1:
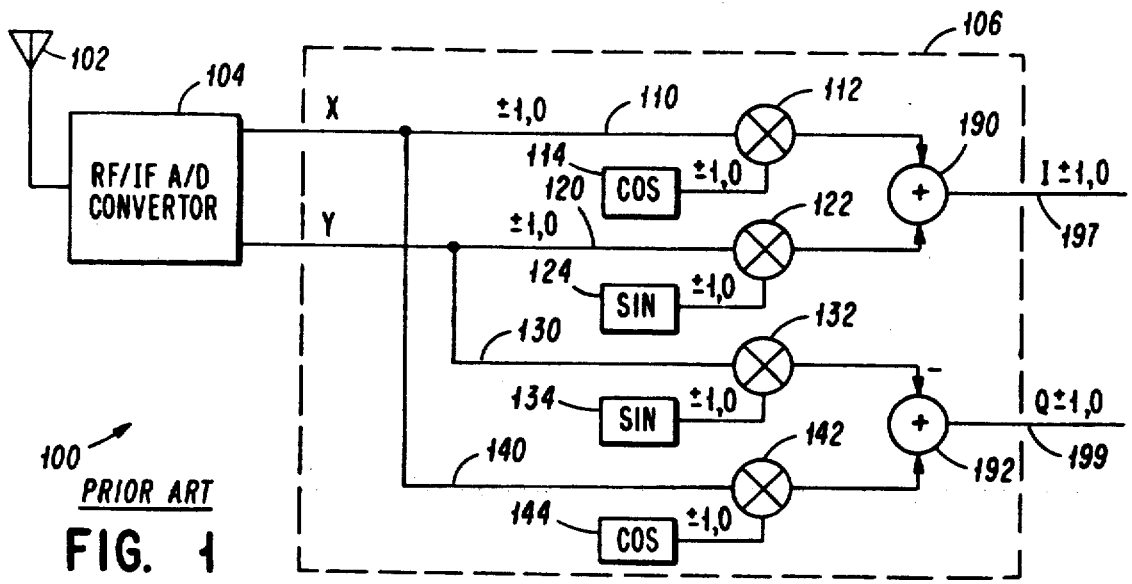
FIG. 1 is a block diagram of a prior art GPS receiver showing a 3-level digital input signal and essentially a single sideband mixer.

Now referring to FIG. 1, there is shown a prior art GPS receiver generally designated 100 having an antenna 102 for receiving signals from GPS satellites (not shown) and providing a receive signal to RF/IF and A/D converter 104, which outputs on line 110 and X digital signal having either +1, −1, or 0 value and outputting on line 120 a digital Y signal having either +1, −1, or 0 value. Lines 110 and 120 go into phase rotator 106 which includes mixer 112, which is coupled to line 110 and cosine function approximater 114 which provides signals either of +1, −1, or 0. Phase rotator 106 is also shown having mixer 122 coupled with line 120 and also coupled with sine function approximater 124, the outputs of mixers 112 and 122 are provided to adder 190 which outputs the I signal on line 197 which is either a +1, −1, or 0 signal. Phase rotator 106 is also shown having lines 130 and 140 coupled with mixers 132 and 142 respectively. Mixer 132 is shown coupled with sine function approximater 134 while mixer 142 is shown coupled with cosine function approximater 144. The outputs of mixers 132 and 142 are shown coupled with adder 192 where the input into 192 from mixer 132 has been reversed. The output of adder 192 is the Q signal on line 199. Preferably, rotator 106 is totally performed within or part of a single integrated circuit chip.

Figure 2:
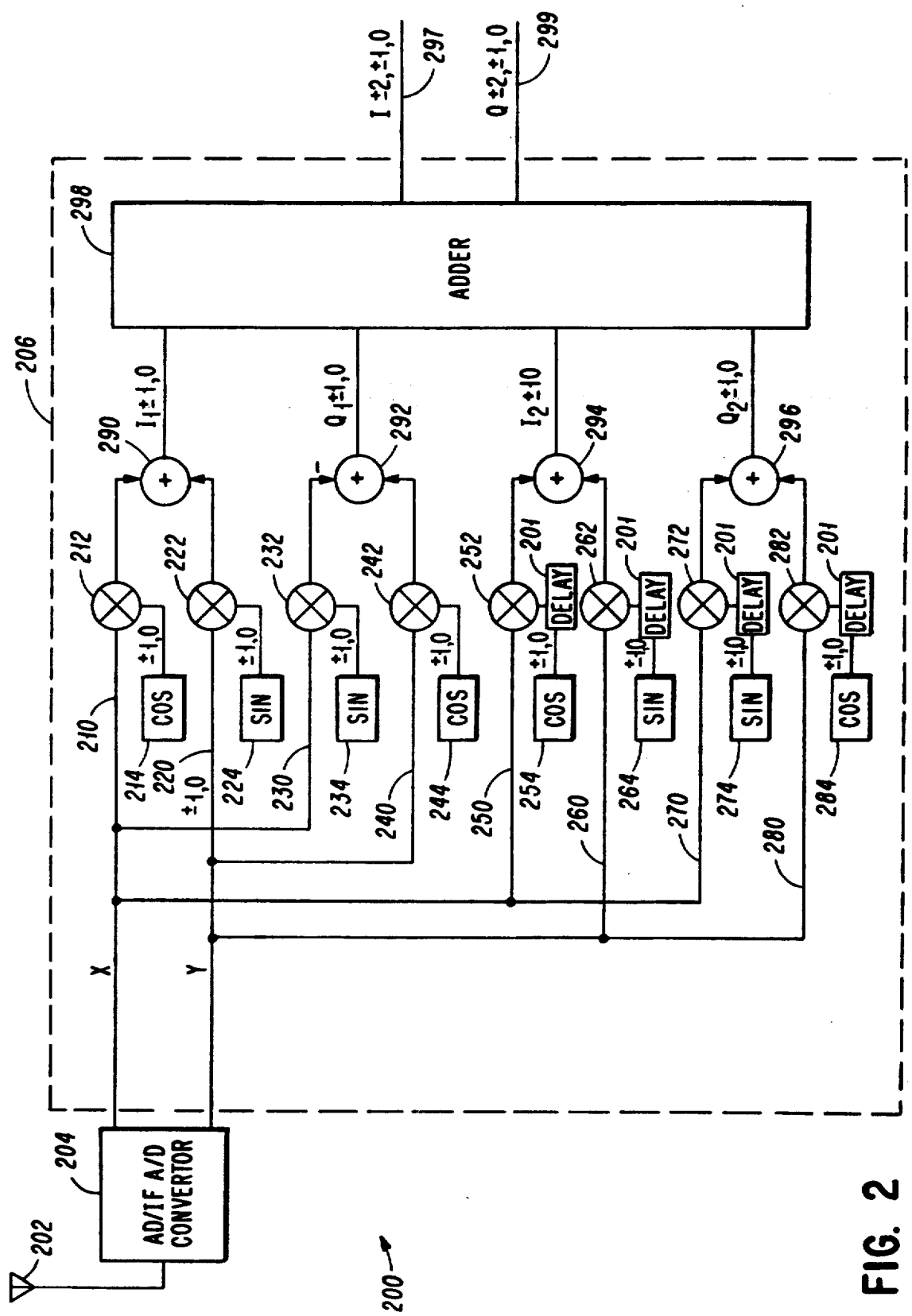
FIG. 2 is a block diagram of a GPS receiver, of the present invention utilizing a first single sideband mixer, a second single sideband mixer, and associated delay.

Now referring to FIG. 2, there is shown an improved GPS receiver, of the present invention, generally designated 200, having an antenna 202 and a RF/IF A/D converter 204 which outputs signals on lines 210 and 220. Also shown is improved phase rotator 206 having dual 3-level carrier injection signal demodulators which are accomplished by providing a 3 level digital X signal on line 210 and a 3-level digital Y signal on line 220. The 3-level digital signal on line 210 is mixed with the 3-level approximated cosine function from cosine function approximater 214 at mixer 212. The 3-level digital Y signal provided on line 220 is mixed with the output of sine function approximater 224, by mixer 222. The outputs of mixer 212 and 222 is combined at adder 290, which provides a $I_1$ signal having 3 digital levels. Also shown is mixer 232 which accepts 3-level digital X signals from line 210 by a line 230 and mixes it with the output of approximate sine function approximater 234 which outputs 3-level digital signal. The output of mixer 232 is inverted and provided to adder 292. Mixer 242 accepts 3-level digital Y signals on line 240 and mixes it with the 3-level digital output of cosine approximater 244 and outputs a signal to adder 292. The output of adder 292 provides a $Q_1$ signal having 3 digital levels.

The X signals on line 210 and the Y signals on line 220 are provided to a second array of mixers and 3-level carrier injection signals wherein the injection signals are delayed by delay 201. Line 250 provides 3-level digital X information to mixer 252 which is mixed with the 3-level injection signal output from cosine approximater 254, which is appropriately delayed by delay 201. The output of mixer 252 is provided to adder 294. Mixer 262 accepts input from line 260 and the delayed 3-level injection signal from sine approximater 264 and provides its output to adder 294 which has an output of $I_2$, which is a 3-level digital signal. Mixer 272 receives input from line 270 and from delayed sine function approximater 274 and provides its output to adder 296 while mixer 282 accepts an input on line 280 and from delayed cosine function approximater 284 and provides its output to adder 296 which itself has an output of $Q_2$, a 3-level digital signal. Signals $I_1$, $Q_1$, $I_2$ and $Q_2$, all 3-level digital signals, are provided to summer 290 which outputs on line 270 a 5-level digital signal I and on line 299 a 5-level digital signal Q.

Figure 3A:
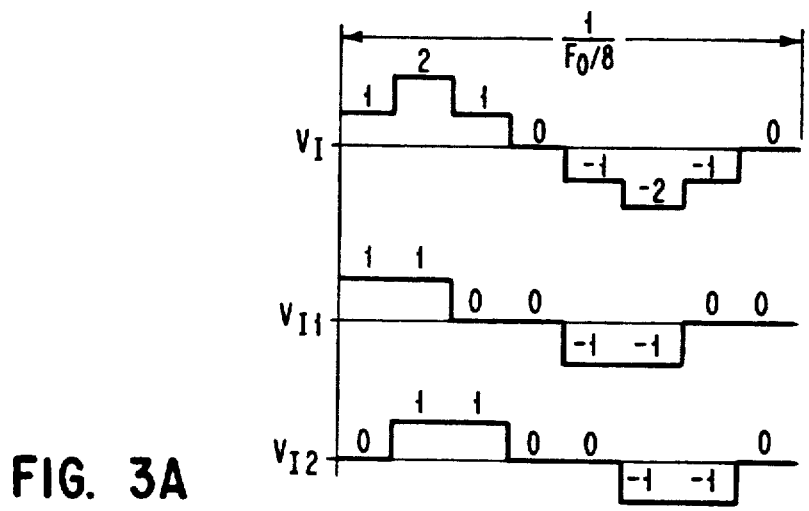
FIG. 3A is a graphic representation of two identical 3-level injection signals where the signals are separated by a ¼ cycle delay and further shows the superposition of those injection signals to emulate a 5-level cosine injection signal.

Now referring to FIG. 3A, there is shown a first wave form $V_I$, having a sinusoidal wave form where one cycle is divided into 8 equal segments and the possible values of the wave form are plus or minus 2, plus or minus 1, or 0. The sub I is a super position of the 3-level digital sinusoidal wave forms represented as $V_{I1}$, and $V_{I2}$, which are identical wave forms except that $V_{I2}$ has been delayed by ⅛ of a cycle.

Figure 3B:
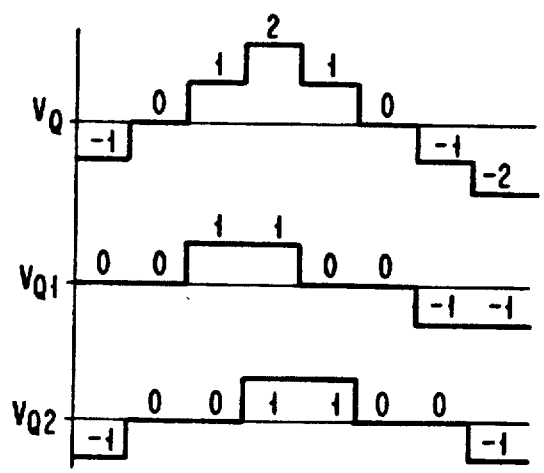
FIG. 3B is a graphic representation of two identical 3-level injection signals where the signals are separated by a ¼ cycle delay and further shows the superposition of those injection signals to emulate a 5-level sine injection signal.

Now referring to FIG. 3B, there is shown the $V_Q$ signal of the present invention, which is a super position of $V_{Q1}$ and $V_{Q2}$ in a manner as described above for FIG. 3A.

The present invention is used to perform a single sideband mixer to demodulate a down-converted GPS signal. The functions performed are:

$$Si(t) = X(t) * Vi(t) + Y(t) * Vq(t) \quad (1)$$

$$Sq(t) = X(t) * -Vq(t) + Y(t) * Vi(t) \quad (2)$$

where
X(t), Y(t) are digitized GPS IF signals having a value of +1, 0, or −1

Vi(t) and Vq(t) are digital approximation of a cosine and sine, and t is the processing period, it can be 1/fo or ½fo.

Where fo is 10.23 MHz

The present inventions breaks up 5-level injection signals Vi and Vq approximated by −2, −1, 0, +1, and +2 into two 3 level injection signals each represented by −1, 0 and +1. (See FIG. 3)

$$Vi(t) = Vi1(t) + Vi2(t)$$

$$Vq(t) = Vq1(t) + Vq2(t)$$

Vi2(t) and Vq2(t) are generated by delaying Vi1(t) and Vq1(t) for 1/fo period.
Equations (1) and (2) become:

$$\begin{aligned} Si(t) &= X(t)*Vi1(t) + Y(t)*Vq1(t) + X(t)*Vi2(t) + Y(t)*Vq2(t) \\ &= Si1(t) + Si2(t) \end{aligned}$$

$$\begin{aligned} Sq(t) &= X(t)*-Vq1(t) + Y(t)*Vi1(t) + X(t)*-Vq2(t) + Y(t)*Vi2(t) \\ &= Sq1(t) + Sq2(t) \end{aligned}$$

which are the sums of 2 single sideband mixers each using 3-level injection, with the second injection being one period delayed from the first.

Since X(t), Y(t), Vi1(t), Vq1(t), Vi2(t) and Vq2(t) can only be +1, 0, or −1 at any one time, the product of X*V of Y*V can only take on the value of +1, 0, or −1, which can be easily implemented by logic switches and multiplexers.

In addition, since Vi1(t) and Vq1(t) equals to 0 alternately, one of the Product term of X*V or Y*V is always zero. The Si1(t) term can only take on the value of +1, 0, or −1. Similarly, the terms Si2(t), Sq1(t) and Sq2(t) can only have values of +1, 0 and −1. Therefore, the final term Si(t) and Sq(t) can take on the value of +2, +1, 0, −1, and −2. The Si(t) and Sq(t) results are integrated over 1 msec code epoch period by using two simple up-down counters each can be incremented or decremented by 1 or 2.

The advantage of the above approach over a traditional 5-level injection approach is that it eliminated the need to use high speed 2's complement binary adders to compute Si, Sq, summation of Si, and summation of Sq when a 5-level carrier injection signal is used in the single sideband mixer.

Figure 4A:
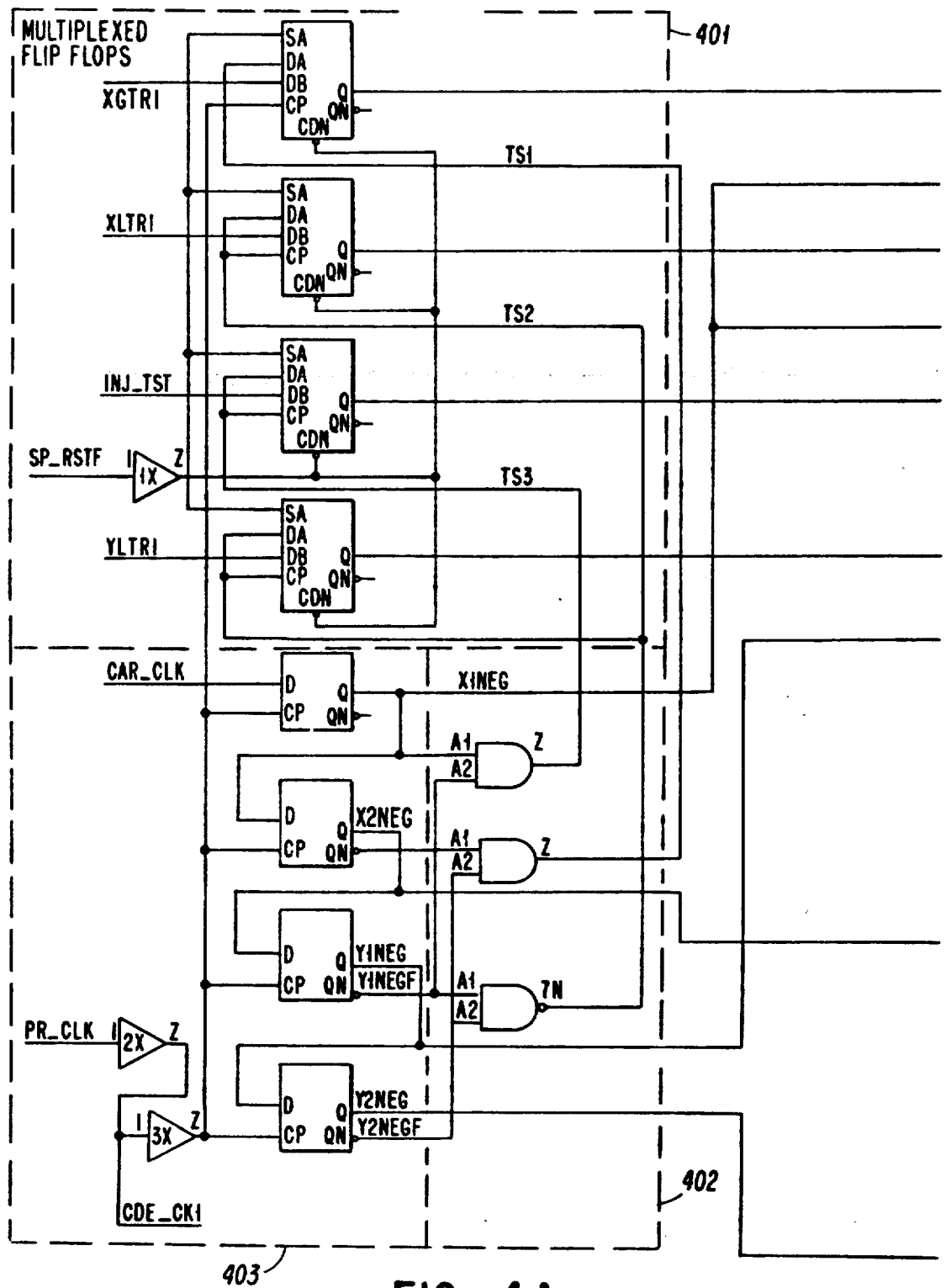
FIGS. 4A, 4B and 4C are interconnecting schematic digital diagrams of the apparatus of the present invention, which include eleven subsections which are bordered by dashed lines.
Figure 4B:
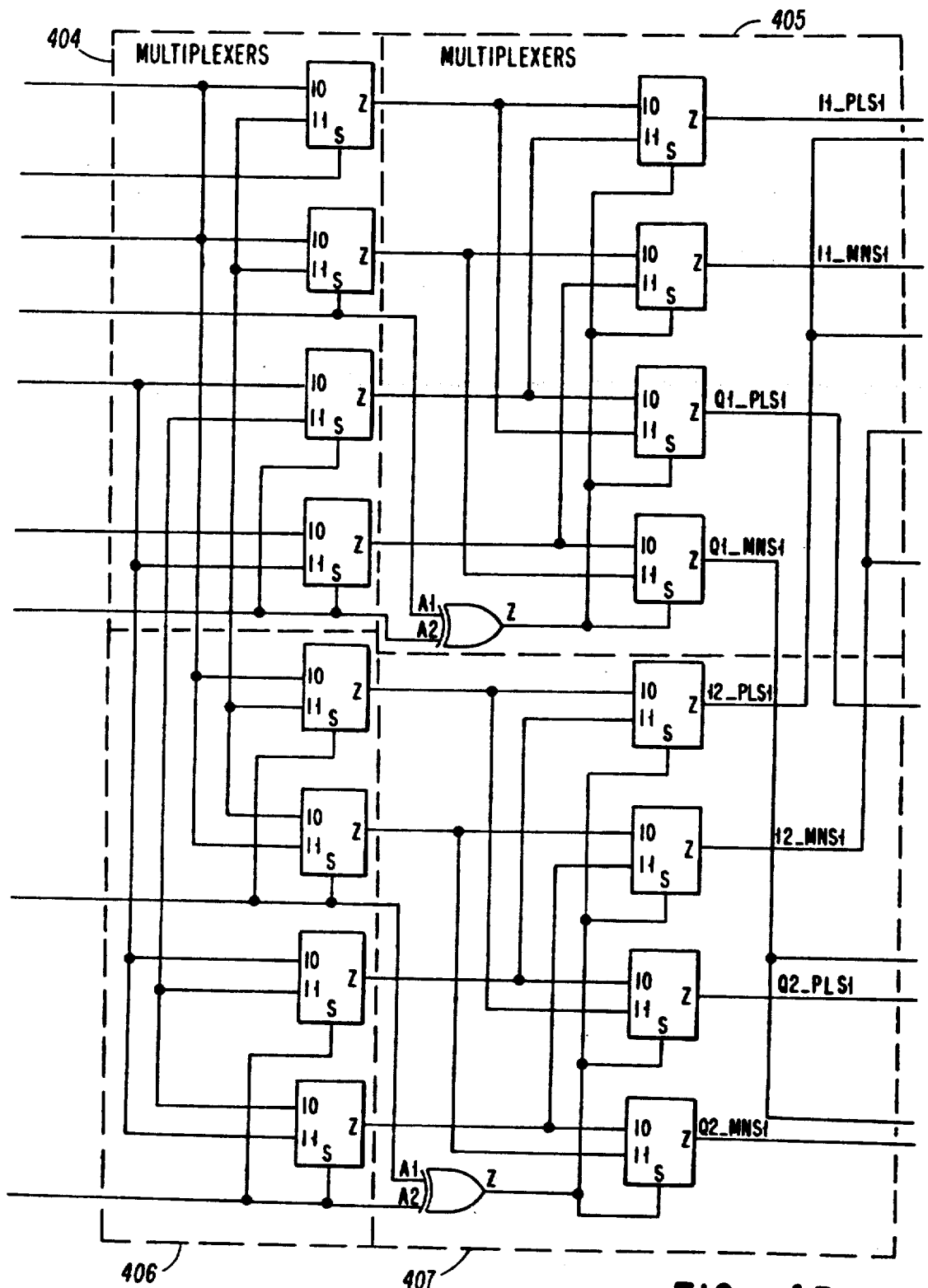
Figure 4C:
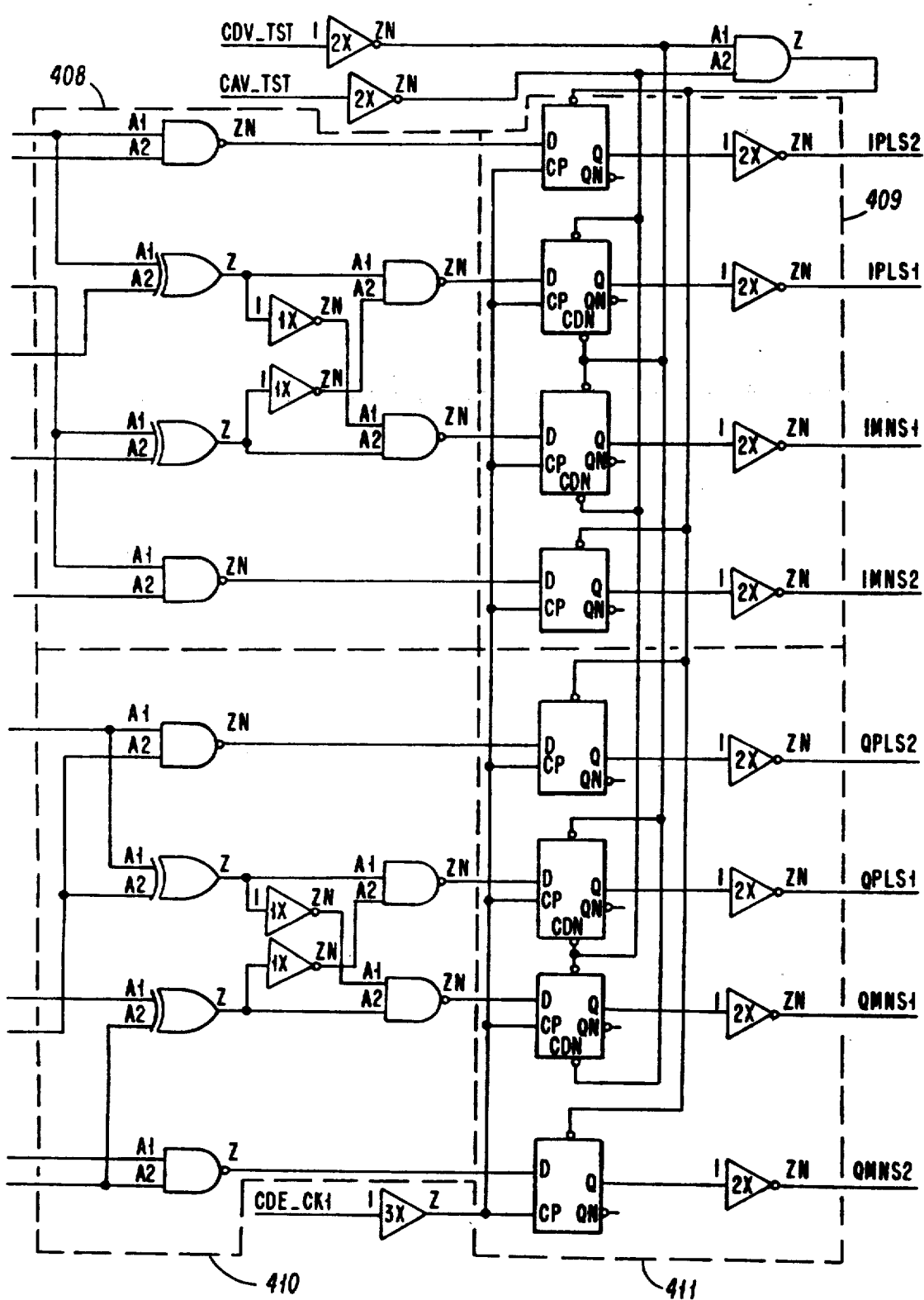

Now referring to FIG. 4, there is shown an improved phase rotator, of the present invention generally designated 400, which is shown divided into 11 blocks or subsections in which:

Block 401—samples the input signals (X>R, X<−R, Y>R, Y<−R) by the PR_CLK signal (nominal frequency of fo). It also selects the test signals (TS1, TS2, TS3) to be used by the phase rotator when INJ_TST signal is high.

Block 402—generates the test signals TS1, TS2, and TS3 to be used for self test.

Block 403—divides the CARR_CLK signal (nominal frequency of fo/8) into four phases (X1NEG, X2NEG, Y1NEG, and Y2NEG) that are synchroniezied to the PR_CLK signal.

Block 404—performs X*VI1, Y*VQ1, X*VQ1, and Y*VI1 functions by multiplying X and Y by +1 or −1 as determined by X1NEG and Y1NEG signals.

Block 405—performs X*VI1+Y*VQ1 to generate I1 _PLS1 and I1 _MNS1 and it also performs −X*VQ1+Y*VI1 to generate Q1_PLS1 and Q1_MNS1. The addition is done by selecting the X product term or the Y product term to the output because the X and Y product terms has a value of zero alternately. NOTE: Blocks 401, 403, 404, and 405 make up the first 3-level phase rotator.

Block 406—performs X*VI2, Y*VQ2, X*VQ2 and Y*VI2 functions by multiplying X and Y by +1 or −1 as determined by X2NEG and Y2NEG signals.

Block 407—performs X*VI2+Y*VQ2 to generate I2_PLS1 and I2_MNS1 and it also performs −X*VQ2+Y*VI2 to generate Q2_PLS1 and Q2_MNS1.The addition is done by selecting the X product term or the Y product term to the output because the X and Y product terms has a value of zero alternately. NOTE: Blocks 401, 403, 406, and 407 make up the second 3-level phase rotator.

Block 408—combines the I results from the two 3-level phase rotators (I1+1, I1−1, I2+1, and I2−1) and produces I+2 , I+1, I−1 and I−2 signals.

Block 409—re-synchronized the combined I outputs to the PR_CLK signal and adds buffering to the output signals for further processing. (code removal and integration)

Block 410—combines the Q results from the two 3-level phase rotators (Q1+1, Q1−1, Q2+1, and Q−1) and produces Q+2, Q+1, Q−1 and Q−2 signals.

Block 411—re-synchronized the combined Q outputs to the PR_CLK signal and adds buffering to the output signals for further processing. (code removal and integration)

While particular embodiments of the present invention have been shown and described, it should be clear that changes and modifications may be made to such embodiments without departing from the true scope and spirit of the invention. It is intended that the appended claims cover all such changes and modifications.

I claim:

1. A GPS receiver comprising:
means for receiving analog signals from a satellite;
means for down-converting, said analog signal and generating a down-converted digital signal in response thereto; and,
means for digitally demodulating said down-converted signal by utilizing a first 3-level digital phase rotator and a second 3-level digital phase rotator, which utilizes a delayed 3-level digital sine injection signal approximater and a delayed 3-level digital cosine injection signal approximater.

2. A GPS receiver comprising:
means for providing a down-converted digital signal; and,
dual 3-level single sideband mixers configured to provide a 5-level carrier injection demodulation function.

3. An improved digital demodulator of the type having a 5-level carrier injection demodulation function wherein the improvement comprises:
a first digital demodulator having a plurality of first 3-level digital sine function approximaters and a plurality of first 3-level digital cosine function approximater, a plurality of digital adders, said first digital demodulator having a first output;
a second digital demodulator having a plurality of second 3-level digital sine function approximaters and a plurality of second 3-level digital cosine function approximaters, a plurality of digital adders, said second digital demodulator having a second output;
said second 3-level digital sine function approximater being delayed by a predetermined time interval with respect to said first 3-level digital sine function approximaters; and,
means for combining said first output and said second output.

4. A GPS receiver comprising:
an antenna for receiving a plurality of RF signals from a satellite;
an RF/IF translator, coupled with said antenna for down-converting said plurality of RF signals to a plurality of intermediate frequency signals;
an analog to digital converter, coupled with said translator for converting said intermediate frequency signals to a plurality of digital signals; and,
a phase rotator digital demodulator, coupled with said analog to digital converter, for demodulating said plurality of digital signals wherein said phase rotator digital demodulator includes a first input for receiving X digital information, a second input for receiving Y digital information, a first X adder coupled with said first input, a second X adder coupled with said first input, a first X cosine approximater coupled with said first X adder, a first X sine approximater coupled with said second X adder, a first Y adder coupled with said second input and a second Y adder coupled with said second input, a first Y sine approximater coupled with said first Y adder, a first Y cosine approximater coupled with said second Y adder, a third X adder coupled with said first input, a fourth X adder coupled with said first input, a delayed X cosine approximater coupled with said third X adder, a delayed X sine approximater coupled with said fourth X adder, a third Y adder coupled with said second input, a fourth Y adder coupled with said second input, a delayed Y sine approximater coupled with said third Y adder, a delayed Y cosine approximater coupled with said fourth Y adder; and,
means for combining an output from said first X adder, said second X adder, said second X adder, said third X adder, said fourth X adder, said first Y adder, said second Y adder, said third Y adder, and said fourth Y adder.

5. A GPS receiver comprising:
means for providing a down-converted digital signal, having X signals and Y signals therein;
means for demodulating said X signals and said Y signals with a nondelayed 3-level injection signal; and generating $I_1$, and $Q_I$ output signals;
means for demodulating said X signals and said Y signals with a delayed 3-level injection signal; and generating $I_2$ and $Q_2$ outputs; and,
means for combining said $I_1$, $I_2$, $Q_1$ and $Q_2$ outputs to provide 5-level I signals and 5-level Q signals.

* * * * *